United States Patent [19]

Suzuki

[11] Patent Number: 4,845,703
[45] Date of Patent: Jul. 4, 1989

[54] WAVELENGTH DIVISION OPTICAL SWITCHING SYSTEM HAVING WAVELENGTH SWITCHING LIGHT MODULATORS

[75] Inventor: Syuji Suzuki, Tokyo, Japan
[73] Assignee: NEC Corporation, Tokyo, Japan
[21] Appl. No.: 934,573
[22] Filed: Nov. 24, 1986
[30] Foreign Application Priority Data Nov. 22, 1985 [JP] Japan .................................. 60-264342
Sep. 4, 1986 [JP] Japan .................................. 61-209008

[51] Int. Cl.$^4$ .............................................. H04B 9/00
[52] U.S. Cl. .......................................... 370/3; 370/1;
455/607; 455/612
[58] Field of Search ................. 370/1, 3, 57; 455/607, 455/612, 600, 606, 617, 618, 619

[56] References Cited
U.S. PATENT DOCUMENTS 3,912,876 10/1975 Muller ...................................... 370/3
4,530,084 7/1985 Strebel et al. .......................... 370/57
4,564,940 1/1986 Yahata .................................... 370/57

FOREIGN PATENT DOCUMENTS

58-202690 11/1983 Japan ...................................... 370/3

Primary Examiner—Robert L. Griffin
Assistant Examiner—L. Van Beek
Attorney, Agent, or Firm—Sughrue, Mion, Zinn, Macpeak & Seas

[57] ABSTRACT

A wavelength division optical switching system comprises a plurality of terminals each generating a light signal on a particular wavelength division multiplexed channel and an optical multiplexer connected to the terminals for multiplexing the light signals from the terminals. A processor identifies the channel of a source terminal requesting a connection and the channel of a destination terminal. A reference light generator generates a plurality of reference lightwaves of different wavelengths. A wavelength switch is provided for switching multiplexed channels by selecting the light signal of the identified source terminal channel and modulating the intensity of one of the reference lightwaves with the selected light signal so that the identified channel of the source terminal is switched to the identified channel of the destination terminal. An optical demultiplexer is connected to the output of the wavelength switch for demultiplexing the switched multiplexed channels and applying the demultiplexed channels to the terminals, respectively.

18 Claims, 5 Drawing Sheets

WAVELENGTH DIVISION OPTICAL SWITCHING SYSTEM HAVING WAVELENGTH SWITCHING LIGHT MODULATORS

BACKGROUND OF THE INVENTION

The present invention relates to an optical switching system, and more particularly to a wavelength division optical switching system and a communications network comprising such optical switching systems.

The recent introduction of optical fiber cables to communications networks have resulted in the need for developing optical switching systems which provide direct switching of light signals sent on optical transmission media. Due to the absence of the need for converting the light signals to electrical signals, optical switching systems are economically advantageous over electrical switching systems which are currently implemented by stored program controlled electronic switching systems.

Since different wavelengths of light can be regarded as a resource for creating transmission channels for carrying light signals, wavelength division multiplexing can multiply the number of channels that can be carried over a single optical fiber. Therefore, if wavelength division multiplexed light signals are transmitted between switching systems, it is desirable to make them directly handle such multiplexed signals to eliminate the need for wavelength division demultiplexers at the interface between a transmission line and a switching system.

A wavelength division optical switching system is described in Japanese Patent Publication No. 58-196796. The known optical switching system comprises optical multiplexers each multiplexing incoming light signals which are carried on different wavelength divided channels. The multiplexed signals are applied to a switching network which comprises an incoming wavelength switch, a space switch and an outgoing wavelength switch. The space switch comprises an array of crosspoints each having a plurality of space switch wavelength divided channels so that the space switch can operate in a wavelength divided fashion. Each of the wavelength switches includes an array of wavelength converters each of which converts the wavelength of a signal to a desired wavelength. A wavelength converter of the incoming wavelength switch converts the wavelength of a source terminal signal to an available space switch wavelength of a particular crosspoint. A wavelength converter of the outgoing wavelength switch converts the space switch wavelength to the wavelength of a destination terminal, so that the wavelength divided channel of the source station is switched to the wavelength divided channel of the destination station. The wavelength-switched multiplexed light signals are applied to an optical demultiplexer where they are demultiplexed into the terminals to establish a connection. Each of the wavelength converters can be implemented by a combination of a nonlinear optical device such as lithium niobate crystal for converting any of the wavelengths of the incoming signals to a fixed wavelength which is shorter than any of the wavelengths assigned to the terminals and an optical detector and a light-emitting diode (as described in article "p-n-p-n Optical Detectors and Light-Emitting Diodes", pages 810 to 813, IEEE Journal of Quantum Electronics, Vol. QE-14, No. 11, November 1978) for converting the fixed wavelength to any of the assigned wavelengths. The use of the lithium niobate crystal is due to the fact that the p-n-p-n optical detectors and light-emitting diodes are not capable of converting wavelengths to shorter ones.

However, the above-mentioned wavelength converter suffers from wavelength instability resulting from difficulty in strictly controlling the proportions of component materials within close manufacturing tolerances and further suffers from temperature dependent wavelength instability. Deviations of wavelengths from those intended are likely to produce crosstalk between adjacent wavelength divided channels, which could lead to a malfunction of switching operations.

SUMMARY OF THE INVENTION

Accordingly, an object of the present invention is to provide a wavelength division optical switching system and a communications network formed by such switching systems which are free from interchannel crosstalk.

The freedom from crosstalk is achieved by the use of light modulation techniques for conversion of light wavelengths. A reference light generator generates a plurality of reference, or constant intensity lightwaves of different wavelengths which are controlled within close tolerances. The reference lightwaves are used as "carriers" for optical modulating devices to be modulated in intensity with light signals. The use of common source of reference light carriers enables the individual channel wavelengths to be easily and precisely controlled. Preferably, the optical modulator comprises a nonlinear optical device having a nonlinear input-to-output characteristic.

According to a first aspect of the present invention, a optical switching system comprises an incoming highway to which an wavelength division multiplexed incoming channels of light signals are applied and an outgoing highway from which wavelength division multiplexed outgoing channels of light signals are delivered. A processor identifies an incoming channel on the incoming highway requesting a connection and an outgoing channel on the outgoing highway to which the connection is to be set up. A reference light generator is provided for generating a plurality of reference lightwaves of different wavelengths. A wavelength switch is connected to incoming and outgoing highways for selecting the light signal of the identified incoming channel and modulating the intensity of one of the reference lightwaves in accordance with the selected light signal such that the identified incoming channel is switched to the identified outgoing channel.

According to a second aspect of the present invention, the wavelength division optical switching system comprises a plurality of terminals each generating a light signal on a particular wavelength divided channel and an optical multiplexer connected to the terminals for multiplexing light signals from the terminals among which a connection is to be set up. A processor identifies a source terminal requesting a connection and a destination terminal to which the connection is to be set up. A reference light generator generates a plurality of reference lightwaves of different wavelengths. A wavelength switch is provided for switching wavelength division multiplexed channels by selecting the identified channel of the source terminal and modulating the intensity of one of the reference lightwaves with the light signal of the selected channel so that the channel of the source terminal is switched to the channel of the destination terminal. An optical demultiplexer is connected to the output of the wavelength switch for demultiplexing the switched wavelength division multiplexed channels and applying the demultiplexed channels to the terminals, respectively.

According to a third aspect of the invention, there is provided an optical communications network having a plurality of interconnected switching systems. The network comprises a common reference light generating means including means for generating a plurality of reference lightwaves having different wavelengths, and optical transmission media for directing the reference beams to each of the switching systems. Each of the switching systems comprises an incoming highway to which wavelength division multiplexed incoming channels of light signals are applied and an outgoing highway from which wavelength division multiplexed outgoing channels of light signals are delivered. A processor identifies an incoming channel on the incoming highway channel requesting a connection and an outgoing channel on the outgoing highway to which the connection is to be set up. A wavelength switch is provided for selecting the light signal of the identified incoming channel and modulating the intensity of one of the directed reference lightwaves in accordance with the selected light signal so that the identified incoming channel is switched to the identified outgoing channel.

BRIEF DESCRIPTION OF THE DRAWINGS

The present invention will be described in further detail with reference to the accompanying drawings, in which.

DETAILED DESCRIPTION

Figure 1:
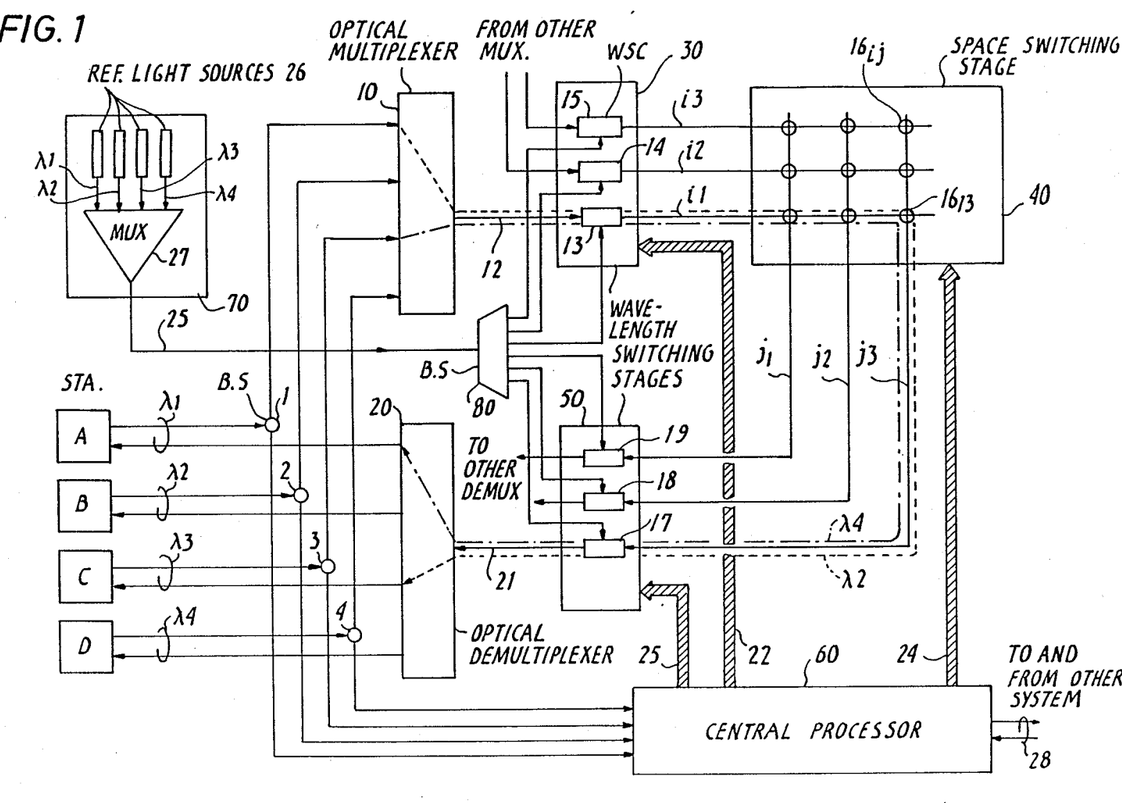
FIG. 1 is a block diagram of a wavelength division optical switching system of the present invention.

Referring to FIG. 1, there is shown a preferred embodiment of a wavelength division optical switching system of the present invention. The wavelength division optical switching system generally comprises an optical multiplexer 10, an optical demultiplexer 20, and a switching network comprising an incoming wavelength switching stage 30, a space switching stage 40 and an outgoing wavelength switching stage 50. The switching network is controlled by a central processor 60.

Optical multiplexer 10 has input waveguides coupled respectively via beam splitters 1, 2, 3 and 4 to subscriber terminal station sets A, B, C and D having assigned wavelengths $\lambda 1$, $\lambda 2$, $\lambda 3$ and $\lambda 4$ respectively. If the switching system is an intermediate or tandem office of an optical communications network, incoming multiplexed light signals from other wavelength division optical switching systems are supplied from their outgoing wavelength switching stages to the incoming wavelength switching stage 30. Incoming light signals from the subscriber stations are sent on the respectively assigned wavelength divided channels and multiplexed by multiplexer 10 into a wavelength-division multiplexed light signal which is conducted through an incoming waveguide, or wavelength division multiplexed highway 12 to a wavelength selector-converter 13 of the incoming wavelength switching stage 30. Incoming wavelength switching stage 30 comprises wavelength selector-converters 14 and 15 which are connected through incoming wavelength division multiplexed highways from other optical multiplexers, not shown, of construction identical to the multiplexer 10 or from other wavelength switching systems via optical transmission media.

Space switching stage 40 is made up of a matrix array of crosspoint switching devices or wavelength selectors $16_{ij}$ (where i and j are row and column numbers respectively) provided at the crosspoints between rows of incoming waveguides $i_1$, $i_2$ and $i_3$ connected respectively to the outputs of wavelength selector-converters 13, 14 and 15 and columns of output light waveguides $j_1$, $j_2$ and $j_3$ which are connected respectively to inputs of wavelength selector-converters 17, 18 and 19 of the outgoing wavelength switching stage 50.

The output of wavelength selector-converter 17 is connected by a waveguide, or outgoing highway 21 to the input of optical demultiplexer 20. The outputs of wavelength selector-converters 18 and 19 are connected to other optical demultiplexers, not shown, which are associated respectively with the other optical multiplexers mentioned above, or connected to the incoming wavelength switching stage or stages of other wavelength switching systems, not shown. Demultiplexer 20 has output waveguides connected respectively by outgoing optical waveguides to the subscriber terminal stations A, B, C and D. Thus, a full-duplex light communication path is provided between subscribers to the switching system.

A switching control signal including the logical address of a destination station is sent on the incoming path of a source station to the central processor 60 where it is translated into a physical address of the destination station. Knowing the physical address of the source station, the central processor 60 performs a path-finding operation with which a connection is established through the switching network between the source and destination stations.

For interoffice or tandem switching, the central processor 60 includes a well-known common channel signaling function which interacts with an adjacent wavelength division switching system through common-channel signaling paths 28.

As will be understood as the description proceeds, the path-finding operation involves the selection of one of wavelength selector-converters 13–15 in accordance with the physical address location of the source station, the switching of the source-station wavelength division multiplexed channel to one of a plurality of space-stage wavelength division multiplexed channels by the selected wavelength selector-converter, the selection of one of wavelength selector-converters 17–19 in accordance with the physical address of the destination station and the switching of the space-stage wavelength division multiplexed channel to the destination station channel by the one of wavelength selector-converters 17–19 which is selected. In the illustrated embodiment, the space switching stage 40 has four space-stage wavelength division multiplexed channels available for each crosspoint to allow it to be shared by four simultaneous connections. In effect, the space switching stage 40 operates in a wavelength divided fashion, independently of the external wavelength-division multiplexed links. For purposes of illustration, each crosspoint of the space switching stage 40 has the same wavelengths $\lambda 1$, $\lambda 2$, $\lambda 3$ and $\lambda 4$ as the terminal wavelength channels. The number of space-stage wavelength division multiplexed channels does not have to coincide with the number of external wavelength division multiplexed channels. The path-finding operation further involves the selection of one of the crosspoint wavelength selectors $16_{ij}$ depending on the physical addresses of the source and destination stations and the determination of an idle channel wavelength based on a switching control algorithm well known in the telephone switching art.

The selection of wavelength selector-converters 13–15 and the wavelength conversion to the space-switch wavelength division multiplexed channel are accomplished by control data supplied on a control bus 22 from central processor 60. The selection of wavelength selector-converters 17–19 and the wavelength conversion to the destination wavelength are accomplished by control data on a control bus 23. The selection of crosspoint wavelength selectors 16 and the determination of a space-switch wavelength division multiplexed channel are provided by control data supplied on control bus 24.

The switching system further includes a reference light generator 70 which supplies a plurality of reference lightwaves of different wavelengths on a light waveguide 25 to a beam splitter 80. Light generator 70 comprises reference light sources 26 which generate reference lightwaves which are strictly controlled at standard wavelengths $\lambda 1$, $\lambda 2$, $\lambda 3$ and $\lambda 4$, respectively, which are multiplexed by an optical multiplexer 27 into the waveguide 25. Beam splitter 80 distributes the multiplexed reference lightwaves to the wavelength selector-converters 13–15 and 17–19, respectively, so that each wavelength selector-converter is supplied with lightwaves at wavelengths $\lambda 1$, $\lambda 2$, $\lambda 3$ and $\lambda 4$ as carriers.

Figure 2:
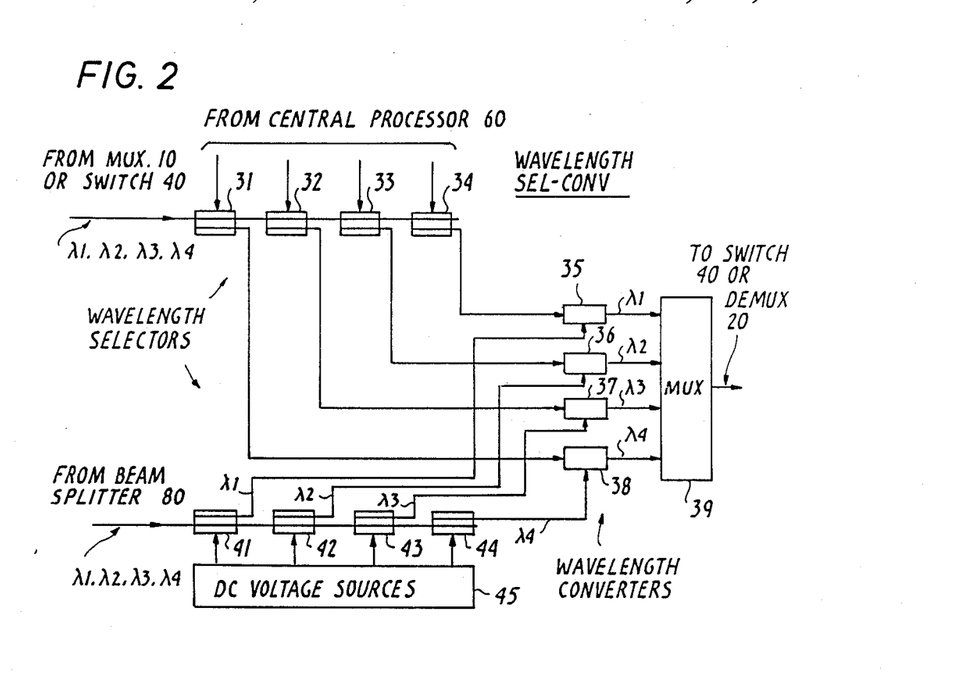
FIG. 2 is a circuit diagram of a wavelength selector-converter of FIG. 1.

Each of the wavelength selector-converters 13–15 and 17–19 is constructed as shown in FIG. 2. Each wavelength selector-converter comprises a first array of wavelength selectors 31, 32, 33 and 34 each having a first and a second light waveguide. The first waveguides of these wavelength selectors are connected in series to a common light waveguide which may be coupled from the multiplexer 10 or from the space switching stage 40 and the second waveguides of selectors 31, 32, 33 and 34 are respectively connected to first inputs of wavelength converters 35, 36, 37 and 38. Such wavelength selectors can be constructed of a known electrooptical switch which directs the flow of light on a substrate of lithium niobate crystal. The light is confined to waveguides in the substrate defined by a surrounding material of lower refractive index. In the absence of an applied voltage light propagating through the first waveguide interacts with the second output waveguide and the light transfers thereinto. If a proper voltage is applied, light remains in the first waveguide.

Wavelength selectors 31–34 have control terminals which receive wavelength selection control signals of appropriate voltage from the central processor 60 to cause the incoming light signal at one of the wavelengths $\lambda 1$ to $\lambda 4$ to be switched to one of the wavelength converters 35–38. Wavelength converters 35–38 effect the conversion of any wavelength to wavelengths $\lambda 1$, $\lambda 2$, $\lambda 3$ and $\lambda 4$, respectively, and supply their outputs to an optical multiplexer 39. Details of the wavelength converters will be described later.

If it is desired to convert wavelength $\lambda 1$ to $\lambda 2$, for example, it is necessary to activate the wavelength selector 33 with a $\lambda 1$ selection voltage to switch a wavelength-$\lambda 1$ signal to the wavelength converter 36 which converts it to wavelength $\lambda 2$. If it is desired to convert wavelength $\lambda 1$ to $\lambda 3$, the wavelength selector 32 is to be activated with a $\lambda 1$-selection voltage to switch the wavelength $\lambda 1$ input to the wavelength converter 37 which converts it to wavelength $\lambda 3$. Thus, if it is desired to convert wavelength $\lambda 2$ to $\lambda 3$, the wavelength selector 32 is activated with a $\lambda 2$-selection voltage.

Further included in each wavelength selector-converter is a second array of wavelength selectors 41, 42, 43 and 44 which are identical in construction to wavelength selectors 31, 32, 33 and 34. Wavelength selectors 31-34 have their control terminals respectively biased at different DC voltages supplied from a DC voltage source 45. The first waveguides of wavelength selectors 41-44 are connected in series to the associated output of the beam splitter 80 and the second waveguides of the selectors are connected respectively to second inputs of the wavelength converters 35, 36, 37 and 38. Wavelength selectors 41, 42, 43 and 44 are constantly activated with $\lambda 1$, $\lambda 2$, $\lambda 3$ and $\lambda 4$ selection DC voltages, so that they selectively switch the wavelength components $\lambda 1$, $\lambda 2$ $\lambda 3$ and $\lambda 4$ of the multiplexed reference light to second inputs of wavelength converters 35, 36, 37 and 38, respectively.

Figure 4:
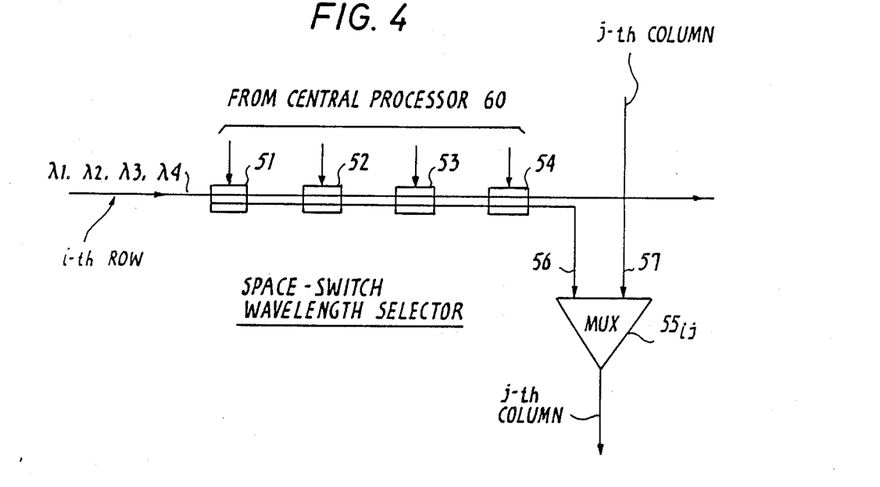
FIG. 4 is a circuit diagram of a space switch wavelength selector of FIG. 1.

Referring to FIG. 4, each crosspoint wavelength selector 16 of the space switching stage 40 is shown as comprising an array of wavelength selectors, or electro-optical switches 51, 52, 53 and 54 identical in construction to the wavelength selectors 31-34. The first waveguides of selectors 51-54 are connected in series in the light waveguide of the "i-th" row of the switch matrix and the second waveguides of these selectors are connected in series to a first input 56 an optical multiplexer $55_{ij}$. Multiplexer $55_{ij}$ has a second input 57 to which multiplexers 55 of the "j-th" column of the switch matrix are connected and provides a multiplexed light signal to the second input of a multiplexer $55_{(i-1)j}$. The control terminals of selectors 51-54 are supplied with wavelength selection voltages from the central processor 60 to switch one or more of the incoming wavelengths $\lambda 1$, $\lambda 2$, $\lambda 3$ and $\lambda 4$ to the multiplexer $55_{ij}$. In the illustrated embodiment, therefore, a maximum of four different wavelength signals can be switched simultaneously through each crosspoint.

Figure 3:
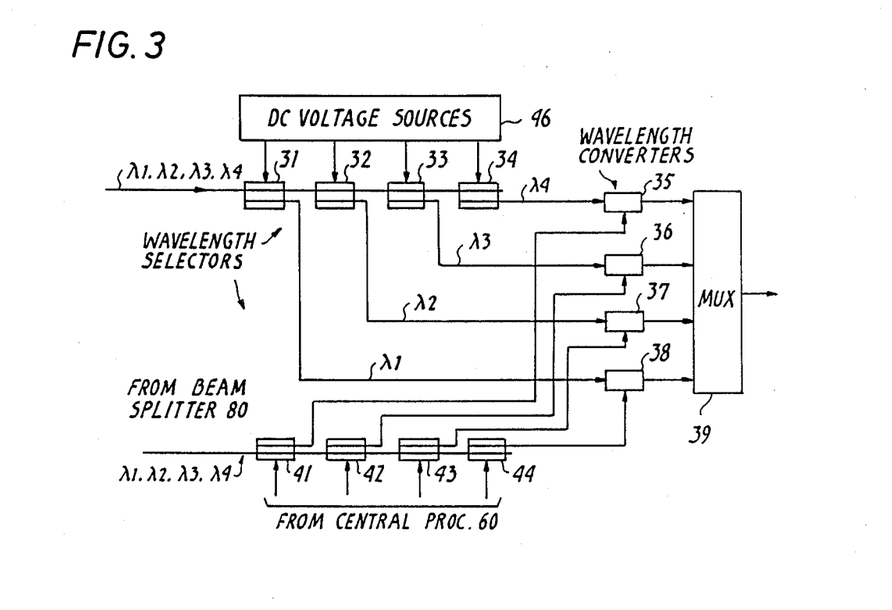
FIG. 3 is a circuit diagram of an alternative form of the wavelength selector-converter.

Before going into the details of the wavelength converters 34–38, it is appropriate to briefly describe the operation of the wavelength switching system of the invention with reference to FIG. 1. Assume that terminal station A desires to set up a connection to terminal station C. The logical address, or telephone number, of the destination station C is sent from source station A to the processor 60 which translates it into a physical location of the destination station C in terms of the location of wavelength selector-converter 17 and the wavelength λ3 of destination station C. Simultaneously, the processor 60 has the knowledge of the physical location of the source station A in terms of the location of wavelength selector-converter 13 and the wavelength λ1 of source station A. Central processor 60 proceeds with the determination of an idle channel wavelength. If wavelength λ2 is selected for a crosspoint of the space switching stage 40, the processor 60 supplies a control signal on control bus 22 which will cause the wavelength selector-converter 13 to activate its selector 33, Fig. 2, with a wavelength-λ1 selection voltage, thus allowing the wavelength λ1 signal from the station A to be passed through selector 33 to the wavelength converter 36 and converted to a wavelength λ2 signal, which is passed through multiplexer 39 to incoming waveguide $i_1$ of space switching stage 40. A wavelength selection signal is supplied on control bus 24 to the crosspoint wavelength selector $16_{13}$ of space switching stage 40 so that one of the wavelength selectors, say, 52 (FIG. 4) is activated with a λ2 selection voltage to cause the wavelength-λ2 signal to be switched to the input 56 of multiplexer $55_{13}$. Simultaneously, another control signal is supplied on control bus 23 to the wavelength selector-converter 17 of wavelength switch 50 to activate its selector 32 with a wavelength-λ2 selection voltage to cause the wavelength-λ2 signal from crosspoint $16_{13}$ to be switched to the wavelength converter 37 and converted to a wavelength-λ3 signal which is applied through multiplexer 39 of wavelength selector-converter 17 to demultiplexer 20 and thence to destination station C, thus establishing a go-path connection between stations A and C as indicated by a dotted line. In a similar manner, the return path of the connection can be established between stations C and A as indicated by a chain-dot line using a switching wavelength λ4, for example. As a result, wavelengths λ1 and λ3 are multiplexed on each of the waveguides 12 and 21 and wavelengths λ2 and λ4 are multiplexed on the waveguide between wavelength selector-converters 13 and 17 through the crosspoint It will be seen from the above description that the wavelength selector-converter of FIG. 2 can be alternatively modified as shown in FIG. 3. In this modification, the wavelength selectors 31-34 are biased with λ1-, λ2-, λ3- and λ4-selection DC voltages, respectively, to switch signal wavelengths λ1, λ2, λ3 and λ4 respectively in fixed relationship to the wavelength converters 35-38 and the wavelength selectors 41-44 are supplied with wavelength selection control voltages. Therefore, the reference wavelengths are selectively applied to wavelength converters 35-38 in response to the control signal on bus 22 or 23.

Figure 5:
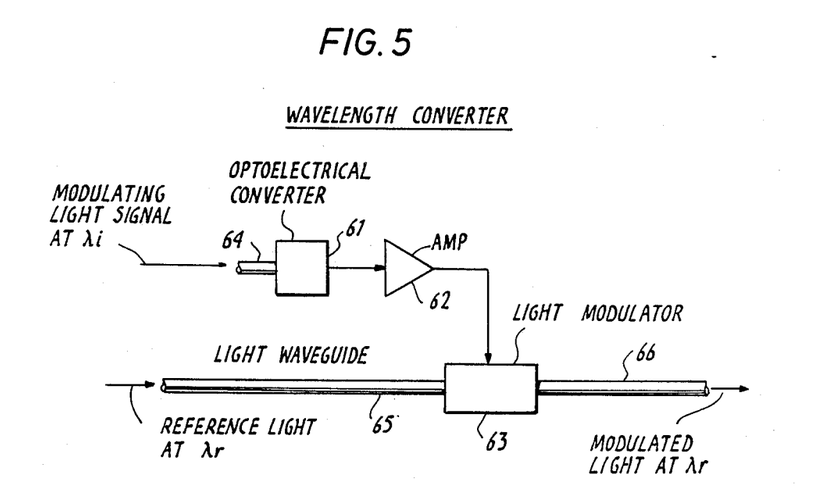
FIG. 5 is a diagram of an electrooptical implementation of a wavelength converter of FIGS. 2 and 3.

Details of the wavelength converters 35-38 and the function of wavelength selectors 41-44 in relation to converters 35-38 will now be described with reference to FIGS. 5 to 9. In FIG. 5, one embodiment of the wavelength converter is illustrated. This wavelength converter comprises an optoelectrical converter 61, an electric amplifier 62 and a light modulator 63. The converter 61 is associated with one of wavelength selectors 31-34 through waveguide 64 to convert a light signal at wavelength λi (where i=1, 2, 3 or 4) to an electrical signal which is amplified by amplifier 62 and applied to light modulator 63 as a modulating electrical signal. A reference lightwave is conducted from an associated one of the wavelength selectors 41-44 through a waveguide 65 to the light modulator 63 and so the reference light at wavelength λr (where r=1, 2, 3 or 4) is modulated in intensity with the signal and emerges through waveguide 66 to multiplexer 39. As a result of the light modulation, the light outputs of wavelength switching stages 30 and 50 maintain their wavelengths to the reference values determined exclusively by the reference light sources 26. If the wavelengths of the reference light sources 26 are strictly controlled to close tolerances, the reference light generator 70 eliminates undesirable wavelength deviations which would otherwise cause interchannel crosstalk.

Figure 6:
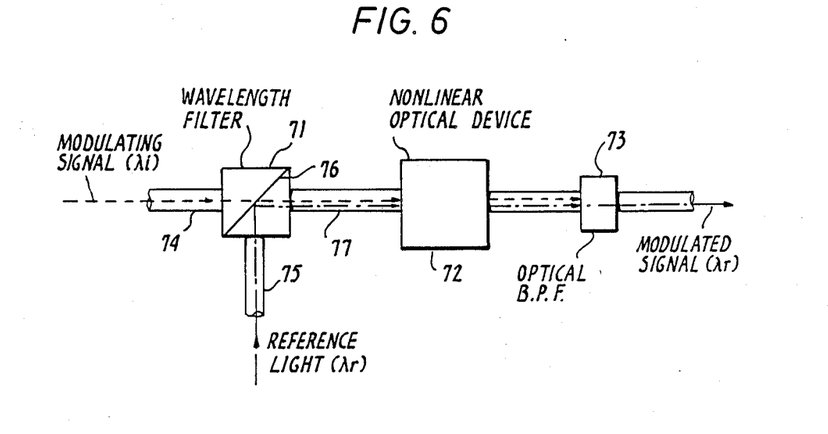
FIG. 6 is a diagram of an optical implementation of the wavelength converter using a nonlinear optical device.
Figure 7:
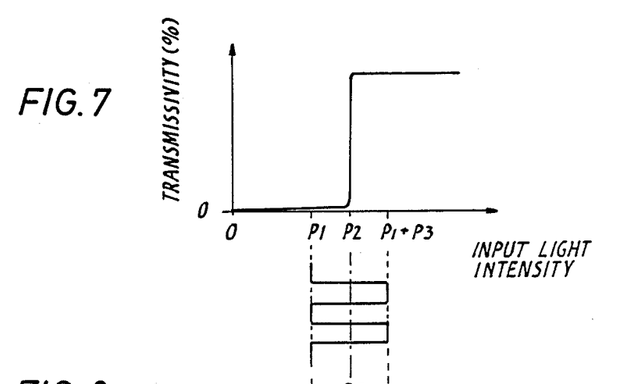
FIG. 7 is a graphic illustration of the nonlinear operating characteristic of the nonlinear optical device.

FIG. 6 is a modified embodiment of the wavelength converter. In this modification, the converter comprises a wavelength filter 71, a nonlinear optical device 72 and an optical band-pass filter 73. The wavelength λi modulating signal and wavelength λr reference light are directed on waveguides 74 and 75, respectively, at 90 degrees to each other to the wavelength filter 71 so that the modulating light signal is passed to the nonlinear optical device 72 and the reference light beam is reflected at right angles on a reflecting plane 76 to the nonlinear optical device 72. The two light beams are combined through a waveguide 77 to the optical device 72. Nonlinear optical device 72 has a nonlinear transmissivity as a function of input light intensity, or differential gain characteristic as shown in FIG. 7. If the reference light has intensity P1 and the modulating light oscillates with an amplitude P3, the intensity of light passing through the nonlinear optical device 72 varies with the modulating signal. The modulated output of nonlinear optical device 72 contains the wavelength components of both optical inputs which propagate through optical band-pass filter 73 and only the reference light component is passed through it to the multiplexer 39. This embodiment is advantageous in that it eliminates the need for optoelectrical conversion.

Figure 8:
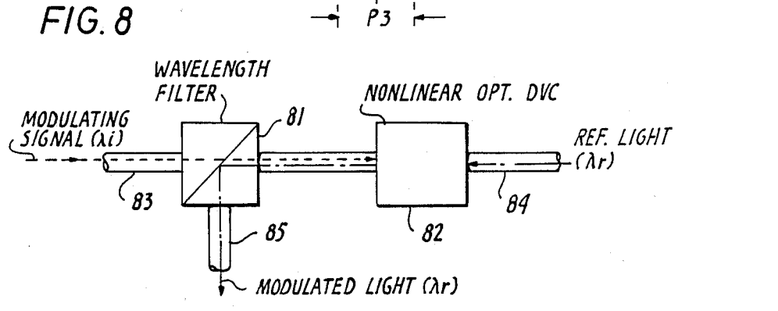
FIGS. 8 and 9 are illustrations of modified forms of the wavelength converter.
Figure 9:
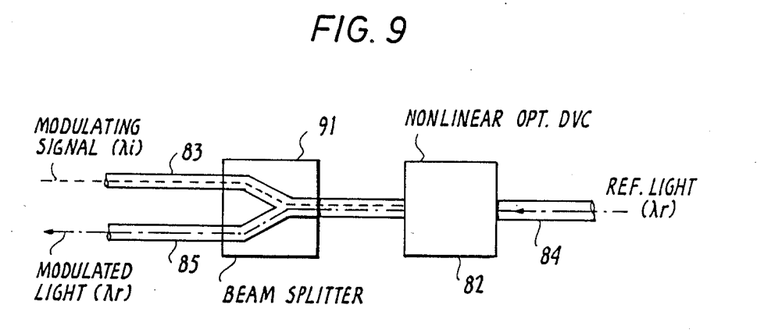

Alternatively, in FIG. 8, the modulating and reference light inputs are supplied through waveguides 83 and 84 respectively, so that the modulating light passes through a wavelength filter 81 and enters the nonlinear optical device 82 and the reference light propagates through the device 82 in opposite direction to the direction of propagation of the modulating light. The reference light is modulated with the modulating input as it propagates through the nonlinear optical device 82 and emerges through the opposite plane and is reflected by filter 81 into waveguide 85 which is coupled to multiplexer 39. Alternatively, the wavelength filter 81 may be replaced with a beam splitter 91 as shown in FIG. 9.

Figure 10:
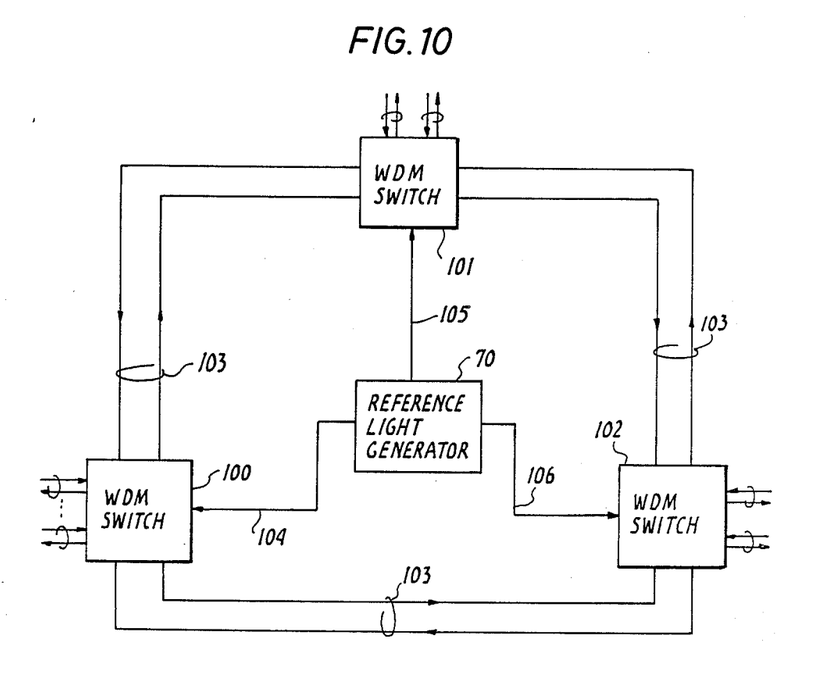
FIG. 10 is a block diagram of a wavelength division switched optical communications network embodying the present invention.

The present invention can be advantageously employed in a switched communications network as illustrated in FIG. 10 in which three wavelength-division multiplexed switching systems 100, 101 and 102 are shown interconnected by optical transmission lines 103 which data and control signals are transmitted. Reference light generator 70 is provided as a common light source which may be installed in the same location with one of the switching systems 100, 101 and 102. The reference lightwaves at wavelengths λ1, λ2, λ3 and λ4 are multiplexed and directed on separate optical transmission media 104, 105 and 106, respectively, to switching systems 100, 101 and 102.

Each of the switching systems includes beam splitter 80 which distributes the reference lightwaves to their wavelength switching stages. In this way, the wavelengths of all optical channels of the communications network can be maintained to common reference light sources.

The foregoing description shows only preferred embodiments of the present invention. Various modifications will be apparent to those skilled in the art without departing from the scope of the present invention which is only limited by the appended claims.

What is claimed is:

1. An optical switching system comprising:
   an incoming highway to which wavelength division multiplexed incoming channels of light signals are applied and an outgoing highway from which wavelength division multiplexed outgoing channels of light signals are delivered;
   processing means for identifying an incoming channel on said incoming highway requesting a connection and an outgoing channel on said outgoing highway to which said connection is to be set up;
   reference light generating means for generating a plurality of reference lightwaves of different wavelengths; and
   wavelength switching means for selecting the light signal of the identified incoming channel and modulating the intensity of one of said reference lightwaves in accordance with the selected light signal such that the identified incoming channel is switched to the identified outgoing channel.

2. An optical switching system as claimed in claim 1, wherein said wavelength switching means comprises:
   of wavelength selectors for selecting
   a plurality a light signal on said incoming highway in accordance with the identified incoming channel; and
   a plurality of wavelength modulators associated respectively with said wavelength selectors for modulating one of said reference lightwaves with the selected light signal.

3. An optical switching system as claimed in claim 2, wherein each of said wavelength modulators has a nonlinear input-to-output optical characteristic which causes one of said reference lightwaves to be modulated in intensity with the selected light signal.

4. An optical switching system as claimed in claim 2, wherein each of said wavelength modulators comprises:
   means for optically combining one of said reference lightwaves and the selected light signal;
   a nonlinear optical device capable of generating a nonlinearly variable optical output as a function of the intensity of an optical input applied thereto, said nonlinear optical device being arranged to receive the output of said combining means to produce a modulated optical output; and
   means for optically extracting an optical component having the wavelength of said lightwave from said modulated optical output.

5. An optical switching system as claimed in claim 1, wherein said reference light generating means comprises:
   a plurality of reference light sources for generating said lightwaves;
   an optical multiplexer for multiplexing said lightwaves; and
   an optical transmission medium for transmitting said multiplexed reference wavelengths to said wavelength switching means.

6. An optical switching system as claimed in claim 1, further comprising space switching means having a plurality of crosspoints each having a plurality of selectable space-switch wavelength division multiplexed channels, said crosspoints being arranged to be connected to said wavelength switching means and responsive to said identified incoming and outgoing channels for establishing said connection through one of the space-switch wavelength division multiplexed channels.

7. An optical switching system as claimed in claim 6, wherein said wavelength switching means comprises:
   incoming wavelength switching means having an incoming light waveguide for selecting the identified incoming channel and switching the selected incoming channel to one of the space-switch wavelength division multiplexed channels of the crosspoint for said connection and applying the switch channel through an outgoing light waveguide to said space switching means; and
   outgoing wavelength switching means having an incoming light waveguide connected to said space switching means for switching the switched incoming channel to said identified outgoing channel.

8. An optical switching system comprising:
   a plurality of terminals each transmitting a light signal of a particular wavelength and receiving a light signal of said particular wavelength;
   an optical multiplexer connected to said terminals for multiplexing light signals from said terminals among which a connection is to be set up;
   processing means for identifying one of said terminals as a source terminal requesting said connection and identifying another of said terminals as a destination terminal to which the connection is to be set up;
   reference light generating means for generating a plurality of reference lightwaves of different wavelengths;
   wavelength switching means, connected to said multiplexer and to said reference light generating means, for selecting one of the multiplexed signals corresponding to said source terminal, selecting one of the reference lightwaves corresponding to said destination terminal, and modulating the intensity of said selected reference lightwave in accordance with the selected light signal so that the wavelength of said selected light signal is converted to the wavelength of the destination terminal; and
   an optical demultiplexer for demultiplexing light signals from said wavelength switching means and applying the demultiplexed light signals to said terminals, respectively.

9. An optical switching system as claimed in claim 8, wherein said wavelength switching means comprises:
   a plurality of first wavelength selectors, connected to the output of said multiplexer, said first wavelength selectors being respectively responsive to outputs of said processing means, for selecting said one of the multiplexed signals;
   a plurality of second wavelength selectors, connected to said reference light generating means, for selecting said one of said reference lightwaves in response to outputs of said processing means; and
   a plurality of wavelength modulators associated respectively with said first and second wavelength selectors for modulating the selected reference lightwave with the selected one of said multiplexed signals.

10. An optical switching system as claimed in claim 9, wherein each of said wavelength modulators has a nonlinear input-to-output optical characteristic.

11. An optical switching system as claimed in claim 9, wherein each of said wavelength modulators comprises:
   means for optically combining said selected reference lightwave and the selected light;
   a nonlinear optical device capable of generating a nonlinearly variable optical output as a function of the intensity of an optical input applied thereto, said nonlinear optical device being arranged to receive the output of said combining means to produce a modulated optical output; and
   means for optically extracting an optical component having the wavelength of said lightwave from said modulated optical output.

12. An optical switching system as claimed in claim 8, wherein said reference light generating means comprises:
   a plurality of reference light sources for generating said lightwaves;
   an optical multiplexer for multiplexing said lightwaves; and
   an optical transmission medium for transmitting said multiplexed lightwaves to said wavelength switching means.

13. An optical switching system as claimed in claim 8, further comprising space switching means having a plurality of crosspoints each having a plurality of selectable space-switch wavelength division multiplexed channels, said crosspoints being arranged to be connected to said wavelength switching means and responsive to the identified channels of said source and destination terminals for establishing said connection through one of the space-switch wavelength division multiplexed channels.

14. An optical switching system as claimed in claim 13, wherein said wavelength switching means comprises:
   incoming wavelength switching means having an incoming light waveguide connected to said multiplexer for selecting the identified channel of the source terminal and switching the selected channel to one of the space-switch wavelength division multiplexed channels of the crosspoint for said connection and applying the switched channel through an outgoing light waveguide to said space switching means; and
   outgoing wavelength switching means having an incoming light waveguide connected to said space switching means for further switching the switched channel to the identified channel of said destination terminal and applying the further switched channel through an outgoing light waveguide to said demultiplexer.

15. An optical communications network having a plurality of interconnected switching systems, comprising:
   a common reference light generating means including means for generating a plurality of reference lightwaves having different wavelengths; and
   optical transmission mediums for directing said reference beams to each of said switching systems;
   each of said switching systems comprising:
   an incoming highway to which a wavelength division multiplexed incoming channels of light signals are applied and an outgoing highway from which wavelength division multiplexed outgoing channels of light signals are delivered;
   processing means for identifying an incoming channel on said incoming highway requesting a connection and an outgoing channel on said outgoing highway to which said connection is to be set up; and
   wavelength switching means for selecting the light signal of the identified incoming channel and modulating the intensity of one of said directed reference lightwaves in accordance with the selected light signal such that the identified incoming channel is switched to the identified outgoing channel.

16. An optical communications network comprising:
   a common reference light generating means for generating a plurality of reference lightwaves having different wavelengths;
   optical transmission media for directing said reference lightwaves to respective ones of a plurality of locations; and
   a plurality of switching systems at said locations, each of said switching systems comprising:
   processing means for receiving dialing signals from said subscriber stations and deriving switching signals therefrom, said subscriber stations transmitting and receiving light signals of particular wavelengths assigned respectively to said subscriber stations;
   an optical multiplexer for multiplexing said transmitted light signals;
   a plurality of wavelength modulating means for receiving said reference lightwaves and modulating the received reference lightwaves with an output of said multiplexer in accordance with said switching signals so that the wavelength of the signal from each of said subscriber stations is converted to a wavelength assigned to a desired subscriber station; and
   an optical demultiplexer for demultiplexing an output of each of said wavelength modulating means into individual light signals and respectively applying the individual light signals to said subscriber stations.

17. An optical communications network as claimed in claim 15, wherein said common reference light generating means includes an optical multiplexer for multiplexing said reference lightwaves into a single multiplexed beam and transmitting the beam through said optical transmission media to each of said switching systems, said switching systems respectively comprising beam splitters for splitting said multiplexed beam into several beams of said reference lightwaves and applying said several beams to said wavelength switching means.

18. An optical communications network as claimed in claim 16, wherein said common reference light generating means includes an optical multiplexer for multiplexing said reference lightwaves into a single multiplexed beam and transmitting the multiplexed beam through said optical transmission media to each of said switching systems, said switching systems respectively comprising beam splitters for splitting said multiplexed beam into several beams of said reference lightwaves and applying said several beams to said wavelength modulating means.

* * * * *

UNITED STATES PATENT AND TRADEMARK OFFICE
CERTIFICATE OF CORRECTION

PATENT NO. : 4,845,703

DATED : July 4, 1989

INVENTOR(S) : Syuji Suzuki

It is certified that error appears in the above-identified patent and that said Letters Patent is hereby corrected as shown below:

Column 7, line 40, after "crosspoint" insert -- $16_{13}$.--

Column 9, line 28, delete "of wavelength selectors for selecting"

Column 9, line 29, after "plurality" insert --of wavelength selectors for selecting--

Signed and Sealed this

Twenty-eighth Day of August, 1990

Attest:

HARRY F. MANBECK, JR.

Attesting Officer      Commissioner of Patents and Trademarks